Oct. 11, 1955
R. H. MITCHEL ET AL
2,720,604
LOW-TEMPERATURE COMPENSATING ALLOY
FOR MAGNETIC INSTRUMENTS
Filed Dec. 28, 1951
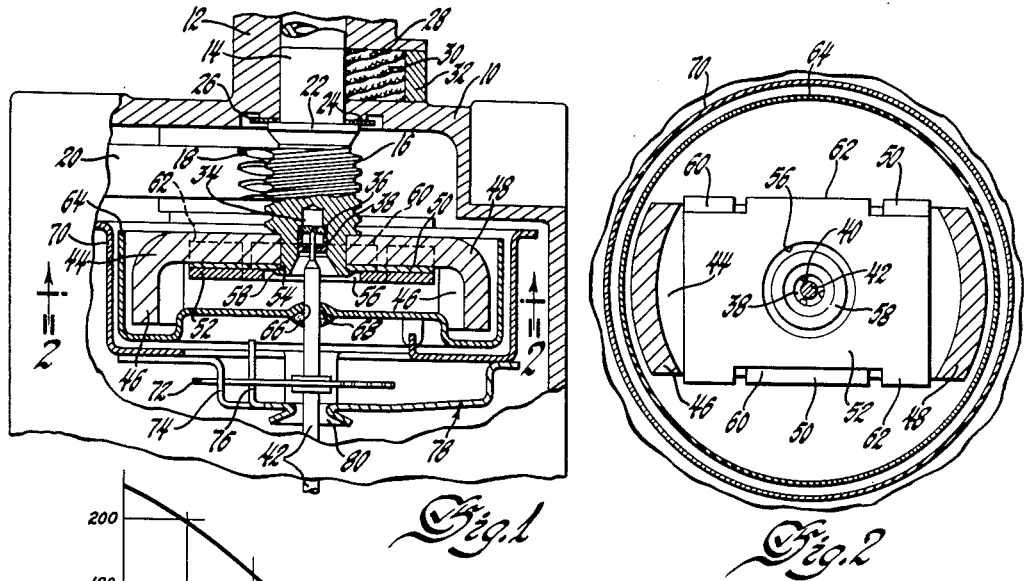
Fig.1
Fig.2
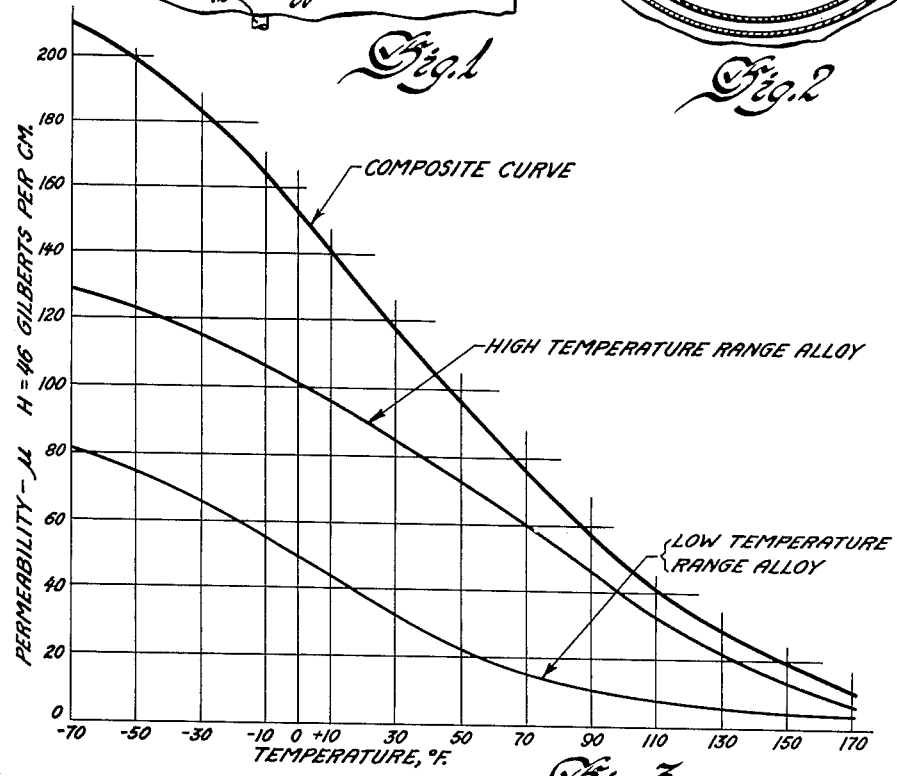
Fig.3
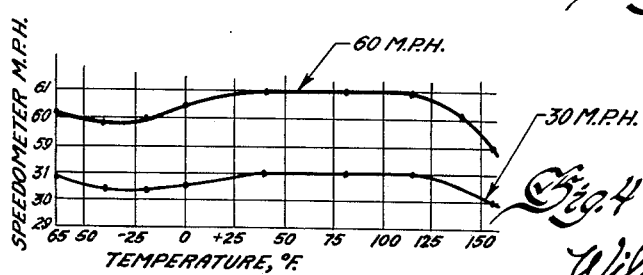
Fig.4
INVENTORS
Ralph H. Mitchel &
Raymond E. Schwyn
BY
Willits, Helwig & Baillio
ATTORNEYS

# United States Patent Office 2,720,604
Patented Oct. 11, 1955

2,720,604

LOW-TEMPERATURE COMPENSATING ALLOY FOR MAGNETIC INSTRUMENTS

Ralph H. Mitchel and Raymond E. Schwyn, Flint, Mich., assignors to General Motors Corporation, Detroit, Mich., a corporation of Delaware Application December 28, 1951, Serial No. 263,790

9 Claims. (Cl. 310—97)

This invention relates to magnetic measuring instruments and particularly to means for making the indications of instruments such as magnetic speedometers almost completely independent of variations in temperature over an unusually wide range of temperatures.

A speedometer of this type generally comprises a stationary field plate within which is positioned a magnet adapted to be driven, directly or indirectly, from the shaft whose rotational speed is to be measured, and a drag element positioned in the magnetic field between the magnet and the field plate and adapted to be displaced from its position of rest a distance proportional to the speed of rotational of the shaft.

Such an instrument provides quite accurate speed indications when operated at the temperature at which it is calibrated, but if it is operated at temperatures appreciably above or below that at which it is calibrated, the speed indications will be considerably in error. This error is caused by the fact that, while the strength of the magnetic field between the poles of the magnet and the field plate remains substantially constant within the range of temperatures to be considered, the electrical resistance of the material of which the drag element is made increases very considerably with increases in temperature and decreases proportionally with decreases in temperature. As is well known, the strength of the eddy currents induced in the drag element by the moving lines of force between the magnet and the field plate varies inversely with these variations in resistance and temperature. Consequently, inasmuch as the deflection of the drag element from its position of rest depends on the strength of the eddy current flowing therein (the strength of the magnetic field remaining constant), the speed indication given thereby will be high at temperatures below, and low at temperatures above, that at which the instrument is calibrated.

It is obvious that the indications of an instrument of the type described will be unaffected by temperature changes if neither the electrical resistance of the drag element nor the strength of the magnetic field passing through the drag element varies with changes in temperature. Since, as has been stated, the strength of the magnetic field passing through the drag element is practically constant throughout the temperature range to be considered, this condition can be fulfilled by making the drag element of a material or combination of materials having a temperature coefficient of electrical resistance approaching zero. Such materials exist, but their electrical resistance is so high as to make their use in an instrument of this type impractical.

Accordingly, it has become a common expedient to make the drag element of a material having a low electrical resistance with the accompanying relatively high temperature coefficient of electrical resistance. The indications of such an instrument will be unaffected by temperature changes if the strength of the magnetic field passing through the drag element thereof is caused to vary in such a manner as to compensate for the changes in resistance of the drag element. This, of course, means that the strength of the magnetic field passing through the drag element must vary directly with the resistance of the drag element. Several means of accomplishing this end have been proposed.

If a piece of magnetic material having a negative temperature coefficient of magnetic permeability is positioned so as to shunt a portion of the magnetic field of the magnet away from the drag element, an increase in temperature will cause less of the flux from the magnet to flow into the shunt and more to flow through the drag element. Similarly, as the temperature decreases, more of the magntic flux will flow into the shunt and less through the drag element. The use of such a shunt will, therefore, tend to compensate the instrument for temperature changes.

Several magnetic materials having appreciable negative temperature coefficients of permeability are known, among which are certain alloys of nickel and iron and certain alloys of nickel and copper. Heretofore neither of these types of alloys, however, has proved to be entirely satisfactory for all applications because of a lack of uniformity in their corrective influence when the instruments are subjected to a very wide range of temperatures.

Operating temperatures for automotive speedometers normally are considered to range from 0° F. to 100° F., with a total error in the readings of 4 miles per hour at a speed of 60 miles per hour being permissible. To meet this requirement, it has heretofore generally been satisfactory to use a single temperature compensator of the above type in combination with a common type of steel magnet containing up to 3% cobalt or 6% chromium and a practically pure aluminum speed cup. However, many types of modern motor vehicles, particularly those which are used for military purposes, are required to be equipped to operate under extreme temperature conditions, such as those encountered in arctic and tropical climates. Accordingly, these requirements necessitate the use of speedometers which are compensated to register speed with a maximum error of 5% in a temperature range of minus 70° F. to plus 160° F., for example. When an instrument of the type described above is subjected to these temperature conditions, its accuracy becomes totally inadequate, the temperature error in such cases commonly being as great as 30 miles per hour over this wide temperature range.

Accordingly, it is a principal object of this invention to provide a magnetic measuring instrument which is highly accurate over an unusually wide range of temperatures. More specifically, it is an object of this invention to provide a low-temperature compensating alloy for use in a magnetic measuring instrument to provide accurate instrument readings at extremely low temperatures.

A further object of this invention is to provide, in a magnetic measuring instrument, a magnetic shunt in the form of a double compensator which is positioned between the poles of a magnet and which possesses such temperature-permeability characteristics as to counteract the effects of variations in the electrical resistance of the drag element on the indications of the instrument when subjected to temperatures ranging from minus 70° F. to plus 160° F. Hence, this invention also encompasses the combination of a temperature compensating unit and a high flux magnet which permits the use of a drag element having an unusually small temperature coefficient of electrical resistance with the resultant advantages hereinbefore explained.

These and other objects are attained in accordance with our invention by the provision of a shunt assembly comprising a double temperature compensator. In this temperature compensator assembly one compensator plate is designed to compensate for the high-temperature errors, while the other compensator plate is formed from an alloy containing 2.2% to 4% silicon, 29% to 32% nickel and the balance substantially all iron and is especially adapted to compensate for errors due to extremely low temperatures. These two plates preferably abut one another and act together to provide a resultant compensation effect which renders the readings accurate at all temperatures.

Although two temperature compensating elements have previously been jointly employed, this has been done only to produce a generally straight temperature-permeability curve through a relatively narrow temperature range. This limited temperature compensation has been accomplished by using component elements one of which has a temperature-permeability curve which is concave upward and the other of which produces a concave downward curve through the same temperature range. The present invention, however, provides such an approximately straight line function through a much wider range of temperatures by combining compensators which supplement each other more efficiently in a different manner. As hereinbefore indicated, a high-temperature range alloy is employed to produce a temperature-permeability curve which is in itself unusually accurate at the higher temperatures, particularly those temperatures from approximately 50° F. to 160° F., while the above-described novel alloy is used to compensate for inaccuracies of the former at lower temperatures, such as those ranging from approximately minus 70° F. to plus 50° F. This low-temperature range alloy provides this compensatory effect because its permeability rises sharply with decreases in temperatures within this lower temperature range. The high-temperature range compensator preferably used is a nickel-iron type of alloy, such as that disclosed in Patent No. 1,988,568 which issued January 22, 1935 to Randolph et al.

To provide for optimum efficiency, we have found it desirable to employ a magnet of high flux material, such as a 35% cobalt steel alloy, in combination with our double compensator unit. The use of such a stronger magnet permits the drag element to be formed of an aluminum-magnesium alloy having a reduced eddy current drag and an exceptionally low temperature coefficient of electrical resistance. The change in resistivity in relation to temperature in this alloy is approximately only one-half as large as that in the case of the approximately pure aluminum speed cups conventionally used.

Other objects and advantages of our invention will more fully appear from the following description of the preferred embodiment shown in the drawing, in which:

Figure 1 is a fragmentary top plan view, with parts broken away and in section, of a speedometer embodying the invention;

Figure 2 is a fragmentary front sectional view along the line 2—2 of Figure 1;

Figure 3 is a graph showing the temperature-permeability curves of the high- and low-temperature range compensators, and the composite curve of the temperature compensator unit resulting therefrom, over a wide range of temperatures; and Figure 4 is a graph showing curves in which actual speeds are compared with speedometer readings at various temperatures.

Referring more particularly to the drawing, in Figure 1 is shown a speedometer having a main supporting frame 10 provided with an apertured shank portion 12. Journaled in this shank is a rotor shaft 14 having a driving worm 16 which meshes with another worm 18 on a transversely extending shaft 20. This second worm shaft 20 is also rotatably journaled in frame 10 and is adapted to drive an odometer which, per se, forms no part of the invention and which therefore is not shown.

Axially adjacent the worm 16, the first worm shaft 14 and the shank 12 of the frame 10 are provided with annular shoulders or flanges 22 and 24, respectively, between which a thrust washer 26 is located. In this manner, the shoulder 24 on the frame and the washer form an end bearing for the shaft 14. The shank 12 of the frame is also shown as having a recess 28 containing a suitable wick 30 which is held in position by a metallic plug 32. The purpose of the wick is to carry a lubricant for lubricating the engaging surfaces of the shank 12 and the shaft 14.

The end of the first worm shaft 14 which is located within the speedometer is provided with an axially extending recess 34 in which is positioned a thrust bearing 36 secured in position by a jewel cup or hole jewel 38, which functions as a side bearing. This hole jewel is preferably secured within the first worm shaft by staking the shaft against it as indicated at 40. A spindle 42 has one end journaled in the hole jewel 38 and abutting the thrust bearing 36. The other end of spindle 42 is similarly journaled in another hole jewel and is provided with the usual pointer to aid in reading the instrument, these parts not being shown inasmuch as they form no part of the invention.

A generally U-shaped magnet 44 having upstanding leg portions 46 and 48 is secured by suitable means to the outer circumference of shaft 14 radially adjacent the hole jewel 38. Positioned between these leg portions or poles of the magnet and abutting the inner face thereof is a temperature compensating assembly comprising a pair of metallic plates 50 and 52 of generally rectangular shape. These plates are attached together by spot welding or other suitable means and are provided with central openings 54 and 56 through which the end of shaft 14 extends. The plate 50 immediately adjacent the magnet functions as a high-temperature range compensator, while the plate 52 is especially designed as a low-temperature range compensator. The compositions and magnetic permeability characteristics of the alloys of which these plates are formed will be hereinafter more fully described in the discussion of the temperature compensating effects of this assembly over a wide range of temperatures.

The end of shaft 14 is crimped over the inner edges of the high temperature compensator plate 50, as shown at 58, to attach the temperature compensating plates to the magnet and to secure these parts to the shaft. Plates 50 and 52 are further prevented from rotating relative to the magnet by being provided with fingers 60 and 62, respectively, which are bent to frictionally engage the edges of the magnet.

A speed cup 64, which functions as a drag element, is coaxial with and partially encases the magnet and temperature compensator assembly. The side walls of the speed cup are shown as being cylindrical while the central portion of its end wall is provided with an opening 66 through which the spindle 42 extends, the speed cup being rigidly secured to the spindle by soldering, as shown at 68, or other suitable means. Concentric with and jacketing the speed cup is an annular field plate 70, which is rigidly affixed to the frame 10 by screws or other appropriate means, not shown. The speed cup, which is pivotally mounted so that its arcuate walls lie between the ends of the magnet and the arms of the armature, cuts the magnetic lines of force, and its rotation is affected by the magnetic drive in the usual manner.

A hairspring 72 has one end secured to the spindle 42 and its other end engaging the inwardly extending legs 74 and 76 of a hairspring tension regulator 78, the hairspring being further coiled by the eddy currents upon rotation of the magnet. The regulator 78, which is provided with an opening 80 through which the spindle extends, in turn is attached to the adjacent end face of the stationary field plate 70 and is rotatably adjustable thereon for regulating the tension of the hairspring.

In accordance with the invention, the low-temperature range compensator 52 employed is an alloy comprising approximately 2.2% to 4% silicon, 29% to 32% nickel, and the balance substantially all iron. Manganese and chromium may also be included in this alloy in amounts not in excess of 1.0% and 3.0%, respectively, but we have obtained best results when the manganese content is not greater than approximately 0.4%. Thus, optimum properties are present in a low-temperature range compensator alloy containing 30% to 31% nickel, 2.3% to 3% silicon, 0.1% to 0.4% manganese and the balance substantially all iron.

In this low-temperature range alloy the nickel content is very important. Increasing the proportion of nickel raises the temperature above which the permeability of the alloy remains practically constant with increases in temperature, this point commonly being known as the Curie point of the alloy. Moreover, raising the nickel content increases the amount of the alloy in the gamma phase within the aforementioned nickel range and lowers its phase-change temperature, as well as increasing the permeability of the alloy and the slope of its temperature-permeability curve.

Inasmuch as small variations in the nickel content in this alloy therefore result in great differences in its temperature-responsive characteristics, it is important that the percentages be kept within the specified limits. If the nickel content is increased above approximately 32%, the Curie point of the alloy is raised to too high a temperature and the temperature-permeability curve is too steep for practical purposes. To insure the necessary permeability, on the other hand, the nickel content should not be lower than approximately 29%. If the amount of nickel is decreased below this percentage, the Curie point is lowered and the phase-change temperature is raised to too great an extent, resulting in poor low-temperature stability. Below a nickel content somewhat less than 29% the alloy becomes very inefficient, and with percentages not much below the minimum limit specified, the alloy has magnetic transmission points within the operating range (minus 70° F. to plus 160° F.).

The silicon content also affects the Curie point of this low-temperature range alloy, a Curie point between approximately 40° F. and 50° F. being desirable in the present instance. The Curie point is shifted toward the lower temperatures with increased amounts of silicon, the optimum shape of the temperature-permeability curve of this low-temperature range being obtained when the silicon content is maintained between 2.3% and 3%, although satisfactory results may be had with a silicon content of 2.2% to 4%. The temperature-permeability curve of the alloy thus possesses a greater slope at the lower temperatures and contributes to provide a magnetic measuring instrument having greatly increased accuracy at these temperatures, the permeability of the alloy remaining practically constant with changes in temperature at temperatures above approximately 50° F. Moreover, the silicon aids in stabilizing the alloy and preventing a permanent change in permeability upon exposure of the alloy to very low temperatures.

The percentage of manganese does not appreciably affect the permeability of the alloy nor the slope of the temperature-permeability curve if maintained below approximately 1.0% and at least 0.05% manganese is desirable to improve the working properties of the alloy. Hence optimum results are obtained when the manganese content in this alloy is between 0.1% and 0.4%. Other incidental impurities, such as phosphorus, carbon and sulphur may be introduced with the iron in the usual small amounts, and their presence appears to have little or no effect upon the permeability of the alloy.

The alloy which is preferably used as the high-temperature range compensator 50 is a type containing from 29.75% to 30.5% nickel, carbon not in excess of 0.25%, manganese not in excess of 1.0% and the balance substantially all iron. This latter type of alloy is disclosed in Patent No. 1,988,568 to Randolph et al.

The particular alloys which should be used as a shunt with any given instrument will, of course, depend upon the temperature-resistance characteristics of the material of which thed rag element is made, and the amount of the alloy to be used will depend upon the strength of the magnet and the position of the shunt relative to the poles of the magnet. To provide for optimum efficiency in the use of our speedometer, therefore, we have found it desirable to employ a high flux magnet containing approximately 35% cobalt or equivalent high flux material. Accordingly, we prefer to use a magnet formed from an alloy comprising 33% to 35% cobalt, 4% to 5% tungsten, 1.5% to 2% chromium, 0.3% to 0.5% manganese, 0.7% to 0.9% carbon and the balance substantially all iron.

Such a magnet permits the use of a hairspring which may be as much as three or four times as strong as those which heretofore have been used in similar instruments. With such a substantially stronger hairspring the effects of jewel friction become negligible, and excessive sway of the indicating pointer is eliminated. Furthermore, the use of this high flux magnet also permits the speed cup to be formed of an aluminum-magnesium alloy having a reduced eddy current drag and whose change in resistivity in relation to temperature is approximately only one-half as large as in the case of a pure aluminum speed cup. When such an alloy is used instead of pure aluminum to form the speed cup, this stronger magnet compensates for the reduced eddy current drag from the aluminum alloy.

The speed cup which is used in combination with the above-described temperature compensating assembly and high flux magnet, therefore, is preferably an alloy containing approximately 2% to 3% magnesium. Thus we have found that an alloy having the following composition is particularly effective as a drag element: 2.2% to 2.8% magnesium, 0.15% to 0.35% chromium, iron plus silicon not in excess of 0.45%, manganese not in excess of 0.10%, zinc not in excess of 0.10%, copper not in excess of 0.10%, and the balance substantially all aluminum. The use of this type of speed cup alloy with the double compensator and magnet provides a speedometer whose readings are particularly accurate over all practicable temperature ranges.

The construction described above is highly efficient due to the upturned ends of the magnet and the parallel walls of the speed cup. Furthermore, shaping the field plate to enclose the speed cup and magnet to thereby shield all the available magnetic flux for efficient influence on the speed cup permits substantially the entire magnetic field to be utilized. Since the full strength of the magnet is being used within the speed cup, a more definite control is provided than with other arrangements, both the active field and the shunt being shielded. The electrical resistance characteristics of the speed cup metal to temperature changes may be accurately measured and the dimensions of the compensator plates determined so as to insure very accurate readings at all temperatures.

For best results the temperature compensator plates are arranged in the manner hereinbefore described and shown, with the high-temperature range plate 50 being positioned between the magnet and the low-temperature range plate 52. Reversing the positions of these plates may result in errors in the readings as high as 25% or 30%.

We have thus provided a temperature compensator assembly which is attached to the rotating magnet and positioned within the magnetic field. This assembly constitutes a shut which permits the reduced electrical resistance of the speed cup tending to cause the readings to be too high at low temperatures to be compensated by the increased permeability of the compensator plates. At temperatures above those for which the instrument is calibrated, on the other hand, the reverse is true, the reduced permeability of the double compensator permitting more of the flux to pass through the speed cup to counteract the increased resistance of the speed cup. Hence the temperature compensating assembly directly controls the proportion of the magnetic flux which passes through the speed cup to thereby provide maximum accuracy of speed indication over an exceptionally wide temperature range.

The efficiency of the above-described double compensator assembly can be seen from the curves shown in Figure 3. In this graph, the abscissas of the curves are temperatures ranging from minus 70° F. to plus 160° F., while the ordinates represent the magnetic permeability of the compensating plates while subjected to a magnetic field of constant strength, the particular curves shown resulting when the field intensity was 46 gilberts per cm. From this graph it can be seen that the high-temperature range alloy employed produces a temperature-permeability curve which is itself unusually accurate at the higher temperatures, particularly those temperatures from approximately 50° F. to 160° F., while the low-temperature range alloy used has a temperature-permeability curve whose slope is substantially greater at the lower temperatures, especially those between minus 70° F. and approximately plus 50° F., than at the higher temperatures. In this manner the low-temperature range alloy compensates for inaccuracies of the high-temperature range alloy which result from the temperature-permeability curve of the latter having too small a slope at these lower temperatures. Hence, the composite of these two curves is a sum or resultant which is a generally straight line through the wide temperature range from minus 70° F. all the way to plus 160° F.

As can be seen from Figure 4, wherein speedometer readings in miles per hour are plotted against temperature, the actual speeds indicated by the two curves vary insignificantly from the speedometer readings. This is true both at lower speeds, as indicated by the thirty miles per hour curve, and at higher speeds, as shown by the sixty miles per hour curve. It will be noted, in fact, that over the temperature range from minus 65° F. to plus 160° F., the 60 miles per hour curve indicates that there was approximately only a two miles per hour maximum variation between the speedometer reading and the actual speed of the vehicle being tested. The 30 miles per hour curve shows that the inventive speedometer is even more accurate at lower speeds over this wide temperature range, the maximum variation in the speedometer readings being approximately only one mile per hour in this latter instance. Thus it will be seen that this invention provides a magnetic measuring instrument in which errors due to temperature are only slightly over 3% when the instrument is subjected to all temperatures which might possibly be encountered.

It is to be understood that, while our invention has been described by means of certain specific examples, the scope of our invention is not to be limited thereby except as defined in the appended claims.

We claim:

1. A temperature-responsive compensator for magnetic measuring instruments formed from an alloy containing 2.2% to 4% silicon, 29% to 32% nickel, and the balance substantially all iron.

2. A temperature-responsive compensator for magnetic measuring instruments formed from an alloy comprising 2.2% to 4% silicon, 29% to 32% nickel, manganese not in excess of 1%, and the balance substantially all iron.

3. A temperature-responsive compensator for magnetic measuring instruments formed from an alloy comprising 2.2% to 4% silicon, 29% to 32% nickel, 0.05% to 1.0% manganese, chromium not in excess of 3%, and the balance substantially all iron.

4. In a magnetic measuring instrument, a temperature-responsive compensator for correcting errors in readings due to low temperatures, said compensator being formed from an alloy comprising 2.3% to 3% silicon, 30% to 31% nickel, 0.1% to 0.4% manganese, and the balance substantially all iron plus incidental impurities.

5. In a measuring instrument, the combination of a rotatable magnet and a magnetic shunt positioned in the magnetic field of said magnet, said shunt comprising an alloy for compensating for high-temperature range errors, and a dissimilar alloy for compensating for low-temperature range errors and containing 2.2% to 4% silicon, 29% to 32% nickel, and the balance substantially all iron.

6. In a magnetic measuring instrument, the combination of a main frame, a magnet rotatably supported by said frame, and a magnetic shunt positioned in the magnetic field of said alloy, said shunt comprising two bodies of dissimilar alloys, one of said bodies compensating for high-temperature range errors, the other of said bodies compensating for low-temperature range errors and comprising 2.2% to 4% silicon, 29% to 32% nickel, manganese not in excess of 1%, and the balance substantially all iron.

7. In a magnetic measuring instrument adapted for use over a wide temperature range, the combination of a main frame, a magnet rotatably supported by said frame, a temperature compensating assembly positioned between the poles of said magnet and rotatable therewith, said compensating assembly comprising a high-temperature range compensator plate containing between 29.75% and 30.5% nickel and the balance substantially all iron, said high temperature range compensator plate being positioned against the lower surface of said magnet, and a low-temperature range compensator plate comprising 2.2% to 4% silicon, 29% to 32% nickel, and the balance substantially all iron, said low temperature compensator plate being positioned against the side of the high temperature range compensator plate opposite said magnet.

8. In a magnetic measuring instrument for use over a wide temperature range, the combination of a main supporting frame, a stationary field plate affixed to said frame, a magnet rotatably positioned within said field plate, a drag element interjacent said magnet and said field plate and mounted for differential rotation with said magnet, and a magnetic shunt comprising two bodies of dissimilar alloys secured to the bottom of said magnet and located between the poles thereof, one of said alloys constituting a low-temperature range compensator and containing 2.3% to 3% silicon, 30% to 31% nickel, 0.1% to 0.4% manganese, and the balance substantially all iron plus incidental impurities, the other of said alloys constituting a high-temperature range compensator and being positioned interjacent said magnet and said low-temperature range compensator.

9. In a speedometer to be used over a wide temperature range, the combination of a main supporting frame, an aluminum base drag element containing 2.0% to 3.0% magnesium rotatably supported by said frame, a high flux magnet positioned generally within and coaxial with said drag element for differential rotation therewith, and a magnetic flux compensating assembly positioned between the poles of said magnet and secured thereto to rotate therewith, said compensating assembly comprising a high-temperature range compensator plate and a low-temperature range compensator plate, said low-temperature range compensator plate being formed from an alloy consisting essentially of 2.2% to 4% silicon, 29% to 32% nickel, manganese not in excess of 1.0%, and the balance substantially all iron.

References Cited in the file of this patent

UNITED STATES PATENTS

| | | |
|---|---|---|
| 1,556,776 | Flintermann | Oct. 13, 1925 |
| 1,697,580 | Wallis | Jan. 1, 1929 |
| 1,740,880 | Smith et al. | Dec. 24, 1929 |
| 1,968,971 | Sullivan | Aug. 7, 1934 |
| 1,988,568 | Randolph | Jan. 22, 1935 |
| 2,232,789 | Kollsman | Feb. 25, 1941 |
| 2,648,019 | Rodanet | Aug. 4, 1953 |

FOREIGN PATENTS

| | | |
|---|---|---|
| 653,460 | France | Mar. 21, 1929 |

OTHER REFERENCES

Metals Handbook, 1948 edition, pages 600 and 601. Published by Amer. Soc. for Metals.